United States Patent [19]

Lehureau et al.

[11] Patent Number: 5,229,874
[45] Date of Patent: Jul. 20, 1993

[54] DEVICE FOR THE DISPLAY OF COLOR IMAGES

[75] Inventors: Jean-Claude Lehureau, Sainte Genevieve des Bois; Bruno Mourey, Voiron, both of France

[73] Assignee: Thomson-CSF, Puteaux, France

[21] Appl. No.: 773,207

[22] Filed: Oct. 9, 1991

[30] Foreign Application Priority Data

Oct. 12, 1990 [FR] France ............... 90 12608

[51] Int. Cl.$^5$ .............................................. G02F 1/133
[52] U.S. Cl. ........................................ 359/64; 359/37; 359/49; 359/87
[58] Field of Search .............. 359/37, 49, 64, 87, 359/89, 90, 91, 102

[56] References Cited

U.S. PATENT DOCUMENTS

| | | | |
|---|---|---|---|
| 3,981,559 | 9/1976 | Channin | 359/87 |
| 4,497,543 | 2/1985 | Aoki et al. | 359/64 |
| 4,611,889 | 9/1986 | Buzak | 359/91 |
| 4,877,309 | 10/1989 | Takamatsu | 359/64 |
| 4,991,941 | 2/1991 | Kalmanash | 359/64 |

FOREIGN PATENT DOCUMENTS

| | | | |
|---|---|---|---|
| 0229287 | 7/1987 | European Pat. Off. | 359/37 |
| 0237160 | 9/1987 | European Pat. Off. | |
| 0179019 | 7/1989 | Japan | 359/64 |

OTHER PUBLICATIONS

R. S. Vatne et al., "New LC/CRT Field Sequential Color Display" Proceeding of the SID, vol. 25, No. 1, 1984.
Patent Abstracts of Japan, vol. 12, No. 406 (P-777), Oct. 27, 1988, & JP-A-63-144 326, Jun. 16, 1988, T. Toshiaki, "Color Liquid Crystal Display Device".
Patent Abstracts of Japan, vol. 12, No. 477 (P-800), Dec. 14, 1988, & JP-A-63 195'624, Aug. 12, 1988, T. Toshiaki, "Color Liquid Crystal Display Device".

Primary Examiner—William L. Sikes
Assistant Examiner—Huy K. Mai
Attorney, Agent, or Firm—Oblon, Spivak, McClelland, Maier & Neustadt

[57] ABSTRACT

The disclosure relates to color image display devices in which the light is modulated spatially by a liquid crystal display screen, and is designed to improve the luminous efficiency and resolution of the color image in display devices of this kind. The disclosed display device includes a light source and a liquid crystal display screen. Each cell of the liquid crystal display screen has means to modulate the two orthogonal polarizations of light independently of each other.

15 Claims, 3 Drawing Sheets

DEVICE FOR THE DISPLAY OF COLOR IMAGES

BACKGROUND OF THE INVENTION

1. Field of the Invention

The invention relates to a device for the display of color images and can be applied to a projection screen type device as well to a direct vision type device. The invention relates particularly to means used to improve the luminous efficiency and, at the same time, the resolution of the color image in display devices using a single light spatial modulator screen.

2. Description of the Prior Art

A light spatial modulator screen generally comprises an array of elementary modulation cells, each corresponding to an elementary surface of the image to be formed. The screens, the modulation cells of which are of the type using a birefringence effect such as liquid crystal cells for example, generally modulate only one component of polarization of light, in such a way that the working of an image display device using a spatial modulator of light such as this requires the selection of one of the two orthogonal directions of polarization of light. The result of this is that the complementary direction of polarization is not used.

Furthermore, to make a color image with a liquid crystal display (LCD) screen type of spatial modulator screen, the liquid crystal cells are most commonly organized into chromatic triplets R-G-B. Each triplet has a cell assigned to the red, a second cell assigned to the green and a third cell assigned to the blue. This assignments are achieved by means of colored filters mounted so as to face each cell.

This organization of the LCD screen into chromatic triplets results in a major loss of transparency, and hence of light, because each component of light is absorbed by colored filters on two-thirds of the surface of the modulator screen. This loss of light gets added to the loss caused by the fact that one of the directions of polarization is not used.

Furthermore, the resolution of a color image thus formed is only one third of the resolution of a monochromatic image that would be obtained with the same LCD screen.

SUMMARY OF THE INVENTION

The invention proposes a novel structure that enables the us and modulation of both the orthogonal directions of light polarization to obtain color images which, at the same time, have a transparency increased by 80% as compared with the prior art. Moreover, the structure of the invention provides image resolution adapted to the physiology of the eye, this resolution being identical to that of a monochromatic image obtained with an LCD screen using the same number of image elements or cells.

According to the invention, there is proposed a device for the display of color images comprising a light source producing a beam of white light called a primary beam, a spatial modulator of light, the spatial modulator of light comprising a matrix array of modulation cells, wherein said device further comprises means for the modulation, in each cell, of the two orthogonal polarizations of light independently of each other.

BRIEF DESCRIPTION OF THE DRAWINGS

The invention will be understood more clearly from the following description, given as a non-restrictive example and made with reference to the appended drawings, of which.

DETAILED DESCRIPTION OF THE INVENTION

Figure 1:
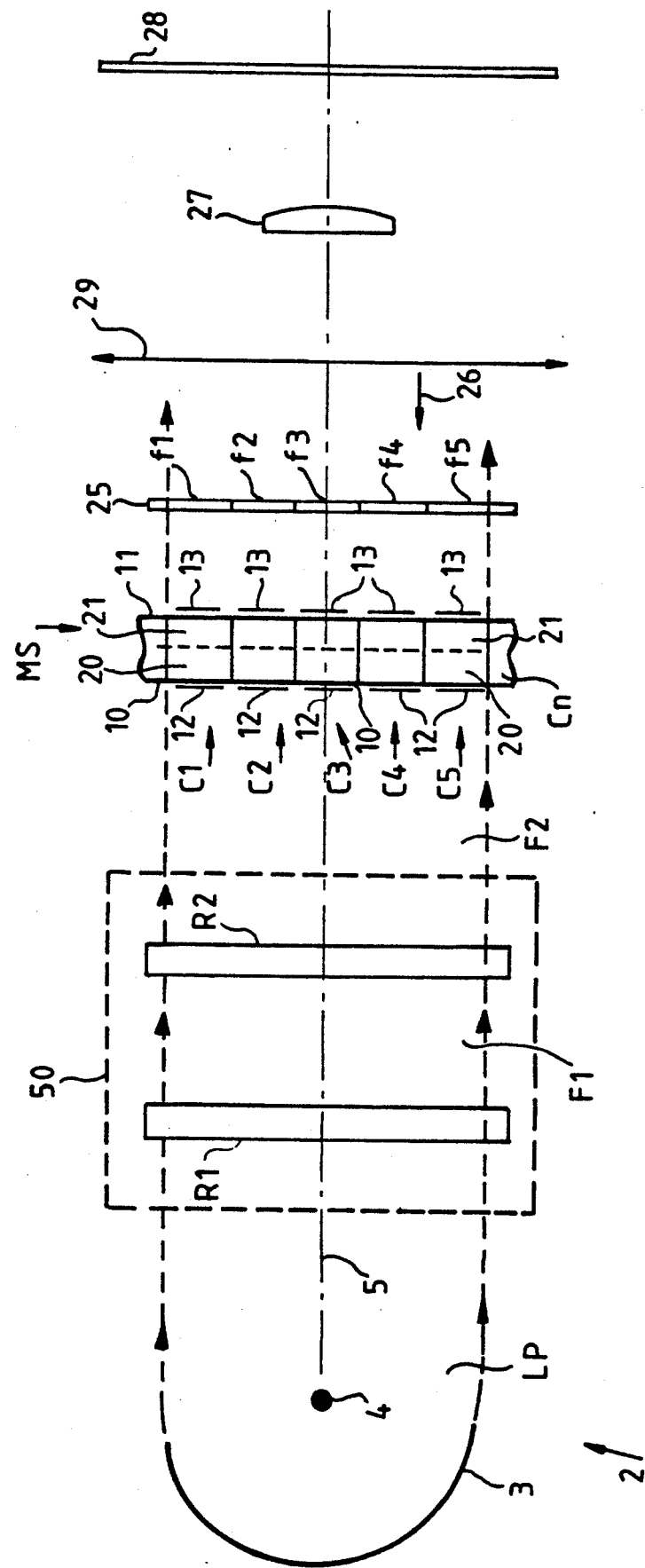
FIG. 1 is a schematic illustration of a preferred embodiment of a color image display device according to the invention.

FIG. 1 gives a schematic view, by way of a non-restrictive example, of the general structure of a color image display device 1 according to the invention.

The display device 1 has a light source 2, producing a white light 3 that has no particular polarization. This white light is called a primary light LP.

In the non-restrictive example described, the light source 2 includes a reflector 3 and a radiant element 4 consisting, for example, of an incandescent filament.

The reflector 3 and the radiant element 4 are positioned on an axis 5 which constitutes the axis of propagation of the primary light LP. This primary light LP gets propagated towards a light spatial modulator screen MS comprising a matrix array of elementary modulator cells designed to form the image to be obtained.

The spatial modulator MS is constituted, for example, by a liquid crystal display screen comprising n liquid crystal cells arranged conventionally in lines and columns. To make the description easier, FIG. 1 shows only five cells C1 to C5 forming a column. Each cell C1 to C5 represents a line of cells. These lines of cells extend perpendicularly to the plane of the figure.

According to one characteristic of the invention, each cell C1 to C5 can modulate two orthogonal directions of polarization of light independently of each other. To this effect, each cell has a novel structure that shall be explained in greater detail further below in the description.

One of the ideas of the invention is to attribute either one of the two orthogonal directions of light polarization to the different wavelengths that correspond to the different primary colors used to form the colored image; then the idea is to modulate the luminance of these different colors by making use of the direction of polarization that they contain.

This principle of acting on certain wavelengths as a function of their direction of polarization may be used in a relatively simple way when the images are formed out of two basic colors or primary colors. However, the use of this principle requires a slight degree of additional complexity when the colored image is formed by means of three primary colors, green, red and blue for example, because there are only two orthogonal directions of polarization for these three colors.

Thus, according to the invention, a first direction of polarization P is given to the wavelengths corresponding to a first primary color and the complementary direction of polarization S, namely the direction orthogonal to the former one, is given to the wavelengths corresponding to the other two primary colors.

According to another characteristic of the invention, the first direction of polarization P is assigned to the wavelengths of the color green and the second direction of polarization S (complementary to the first direction) is assigned to the other two primary colors, namely the red and the blue: these two complementary types of polarization may be modulated independently of each other in each of the liquid crystal cells Cl to C5 of the spatial modulator MS.

According to another characteristic of the invention, notably in order to subsequently differentiate the red and the blue from each other, there is associated, with each liquid crystal cell, either a first filter that transmits the wavelengths corresponding to the green and to the blue or a second filter that transmits the wavelengths corresponding to the green and to the red. This is obtained, for example, by means of a yellow filter for the transmission of the green and of the red and by means of a cyan filter for the transmission of the green and the blue. These two types of filters are distributed in substantially equal numbers.

Both these filters are thus capable of transmitting the green while the red and the blue are transmitted by either one of these filters only. Thus, each liquid crystal cell Cl to C5 can modulate the green in such a way that the resolution is the maximum in the green and more reduced in the red and the blue. However, a distribution of the resolution such as this is well adapted to the physiology of the eye, to the point where it is actually used in many professional cameras.

To give the different wavelengths of the different colors the desired direction of polarization, a chromatic polarizer 50 is interposed between the light source 2 and the spatial modulator MS.

The polarizer device 50 has a first polarizer screen R1 and a second polarizer screen R2 centered on the axis of propagation 5.

In the non-restrictive example described, the first polarizer screen R1 absorbs the wavelengths corresponding to the green and having a first direction of polarization P. It therefore lets through, towards the second polarizer screen, a beam F1 from which these components relating to the green and to the first polarization direction are eliminated. The second polarizer screen R2 absorbs the components relating to the blue and to the red, and having the second direction of polarization S, orthogonal to the first one.

As a consequence the second polarizer screen R2 lets through, towards the spatial modulator MS, a secondary beam F2 wherein, firstly, the only wavelengths relating to the green that remain are those assigned the second direction of polarization S and wherein, secondly, the only wavelengths relating to the red and to the blue that remain are those assigned the first direction of polarization P.

To this end, the first and second polarizer screens R1, R2 may be constituted from a polymer incorporating, in a manner known per se, elongated molecules that are absorbent with respect to given wavelengths. In the first polarizer screen R1, the elongated molecules are chosen to absorb the green. And they are of two types in the second polarizer screen, one being chosen to absorb the red and the other being chosen to absorb the blue. These elongated molecules are oriented in only on direction in each of the polarizer screens R1, R2 and, naturally, these directions of orientation are orthogonal from one polarizer screen to the other so as to correspond to the two orthogonal directions of the polarization of light.

In a first version of the invention shown in FIG. 1, the spatial modulator screen MS is a liquid crystal screen, the cells Cl to C5 of which are formed by means of a liquid crystal consisting of uniaxial absorbent molecules oriented by a nematic. A liquid crystal of this type is a standard one per se and is known as a "guest host" liquid crystal. In the present case, this liquid crystal is preferably chosen so as to have low birefringence in order not t the affect the orientation of the incident polarizations.

Each cell C1 to C5 may be controlled simultaneously by two types of signals, each designed to modulate a direction of polarization P, S. According to one characteristic of the invention, each cell has, to this effect, two sets of electrodes, each applied to one opposite face 10, 11 of the cell Cl to C5.

In FIG. 1, the cells Cl to C5 are shown along their thickness which is parallel to the axis of propagation 5 of the light, and the faces 10, 11 of these cells extend perpendicularly to the plane of the figure. In the non-restrictive example, each first face 10 of each cell Cl to C5 has a first set of electrodes 12 designed to modulate the first direction of polarization P, and each second face 11 has a second set of electrodes 13 designed to modulate the second direction of polarization S.

Figure 2:
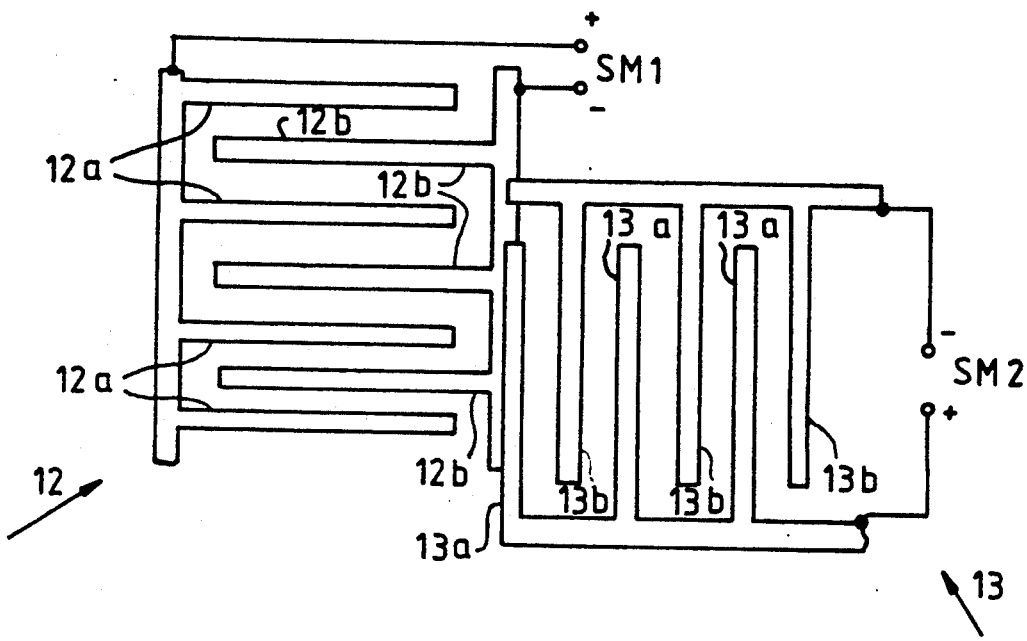
FIG. 2 shows a detailed view of electrodes shown in FIG. 1.

FIG. 2 shows the first and second sets of electrodes 12, 13 of a same cell Cl to C5 in a substantially front view in order to show the relative positions of the different electrodes.

Each set 12, 13 is constituted by two arrays of interdigitated electrodes. One set of electrodes extends perpendicularly with respect to the other set of electrodes. The first set of electrodes 12 comprises, firstly, a first array of electrodes formed by parallel electrodes 12a that are electrically connected to one another. It also has a second array of electrodes 12b that are parallel and electrically connected to one another and are interposed between the electrodes 12a of the first array.

The second set of electrodes 13 is constituted in a similar way, firstly by means of a first array of electrodes 13a that are parallel and electrically connected to one another and, secondly, by means of a second array of electrodes 13b that are parallel and electrically connected to one another, and are interposed between the electrodes 13a of the first array.

The electrodes 12a, 12b of the first set 12 extend in directions perpendicular to those of the electrodes 13b of the second set 13, so as to enable these two sets of electrodes to act on the two orthogonal directions of polarization P, S. The electrodes 12a, 12b of the first set receive a first modulation signal SM1. One of the polarities "+" of this signal SM1 is applied, for example to the electrodes 12a of the first array, and the other polarity, "−", is applied to the electrodes 12b of the second array. This is also the case with the electrodes of the second set 13 which receive a second modulation signal SM2. One of the polarities "+" of this signal SM2 is applied, for example to the electrodes 13a of the first array, and the other polarity, "−", is applied to the electrodes 13b of the second array.

The two modulation signals SM1, SM2 are voltage signals, the value of which ranges from zero to a maximum value. At the value zero, the molecules of the liquid crystal have the orientation given to them by the walls. At the maximum value, the electrical field is the maximum between the electrodes of the two different arrays belonging to the same set 12, 13 of electrodes, and the molecules are then oriented along this electrical field.

Referring again to FIG. 1, this leads, in a certain way, to dividing each cell C1 to C5 into two parts along its thickness. A first part 20, close to the first face and to the first set 12 of electrodes is designed, for example, to modulate the first direction of polarization P; and the second part 21 of each cell, close to the second face and to the second set 13 of electrodes, is designed to modulate the second direction of polarization S orthogonal to the first direction.

In the non-restrictive example described, the electrodes 12a, 12b of the first set 12 extend perpendicularly to the plane of the figure, horizontally for example; and the electrodes 13a, 13b of the second set 13 extend in parallel to the plane of the figure, and vertically. As a result, the application of a modulation signal SM1 to the electrodes of the first set 12 generates field lines (not shown) in the first cell part 20, the main orientation of these field lines being vertical, while the application of the modulation signal SM2 to the electrodes of the second set 13 generates field lines (not shown) in the second part 21, the orientation of these field lines being mainly perpendicular to the plane of the figure.

Thus, the selective absorption of either one of the orthogonal directions of polarizations P and S is done by laying down the molecules under the effect of the electrical field generated by either one of the sets 12, 13 of interdigitated electrodes. On the contrary, the absorption gets cancelled out when the orientation is homeotropic (perpendicular to the walls) under the effect of the orientation given by the walls or faces 10, 11. Or else again, this absorption is cancelled out under the effect of a field which could be developed between the two sets 12, 14 of interdigitated electrodes.

In the non-restrictive example of the description, in absorbing the light that has the first direction of polarization P, the components relating to the green are absorbed, and the components relating to the red and to the blue are absorbed through the absorption of the second direction of polarization S.

According to one characteristic of the invention, the color image may then be formed by means of a filtering screen 25, comprising a same number n of elementary filters f1 to f5 as the spatial modulator MS has modulation cells (C1 to C5). To each cell C1 to C5, there corresponds an elementary filter f1 to f5: each cell C1 to C5 and the filters f1 to f5 assigned to it are concerned by a same elementary section of the second secondary beam F2 which emerges from the second polarizer screen R2 and gets propagated towards the spatial modulator MS. Thus, to each elementary image dot, there corresponds a cell C1 to C5 plus a filter f1 to f5.

According to another characteristic of the invention, the filtering screen 25 may be interposed between the second polarizer screen R2 and the spatial modulator MS, or else it may be positioned after this spatial modulator MS in relation to the direction of propagation of the second secondary beam F2 as shown in the non-restrictive example of FIG. 1. The filtering screen 25 may possibly be integrated with the liquid crystal display screen MS. In this case, each filter f1 to f5 may be constituted by a layer made in a manner that is standard per se on one of the walls of the liquid crystal screen MS directly facing the corresponding cell C1 to C5.

Figure 3:
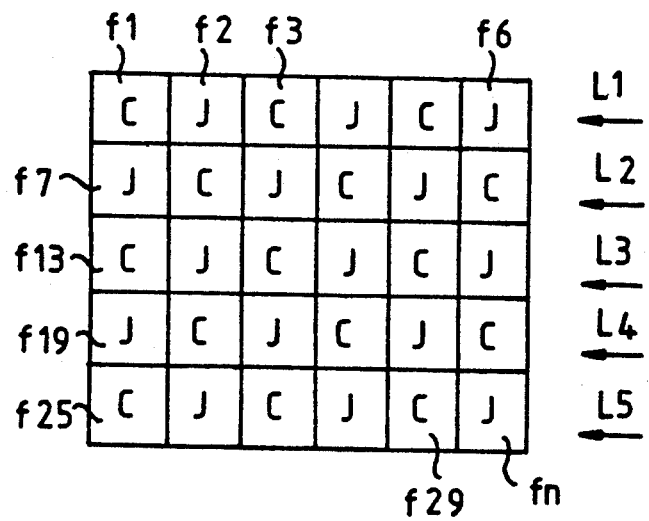
FIG. 3 shows a front view of a filtering screen shown in FIG. 1.

FIG. 3 shows a schematic view of the filtering screen in a front view, along the arrow 26 shown in FIG. 1.

The filtering screen 25 has n elementary filters f1 to fn, positioned in lines L1 to L5 and in columns, each corresponding to a modulation cell C1 to Cn of the spatial modulator screen MS. Each filter f1 to fn represents an elementary dot of the image. In the example shown in FIG. 3, the number n is 30, but it is clear that this number may be different: it may be greater or smaller.

The filters f1 to fn are divided into two types:

the filters first type are designed to let through only the wavelengths relating to the green and to the red: this may be obtained with a yellow filter J;

the filters of the second type are designed to let through only the components relating to the green and to the blue; this may be obtained with a cyan filter C.

In the non-restrictive example described, the elementary filters f1 to f30 are distributed and arranged so that, in the direction of the lines L1 to L6 or in the direction of the columns, a filter of the first type, namely a yellow filter J in the example, succeeds a filter of the second type, namely a cyan filter C in the example.

As explained further above, this enables each modulation cell of the spatial modulator screen MS to modulate the green (essential component of the luminance) and-/or a complementary component which is red or blue, depending on the type of elementary filter f1 to f30 attached to this cell. The type of filter J or C attached to each modulation cell being known, the absorption to be made, of either one of the directions of polarization in each modulation cell, is determined, it being known that the white is obtained by means of two neighboring elementary dots having filters f1 to f30 of different colors J and C. These are for example the first and second filters f1 and f2 positioned in the direction of the line L1 and having respectively the color cyan C and yellow J or again, for example, the seventh and thirteenth filter f7, f13, respectively yellow J and cyan C, which succeed each other in the direction of each column.

Since the saturated white is constituted by the three components with equal power, the theoretical maximum transparency of a cell-filter pair of an elementary image dot is of the order of 60%. This compares favorably with the standard arrangement in red-green-blue triads which enables only 33% of transparency.

To carry out the projection of images, it is enough to add a projection objective 27 and a projection screen 28 to the display device of the invention, on a lens 29, as shown in FIG. 1.

But it is also possible for an observer placed in the position of the projection objective 27 to have a direct view of the colored image, either on the filtering screen 25 or on the spatial modulator screen SM if the filtering screen 25 is positioned between this screen and the second polarizing screen R2.

Figure 4:
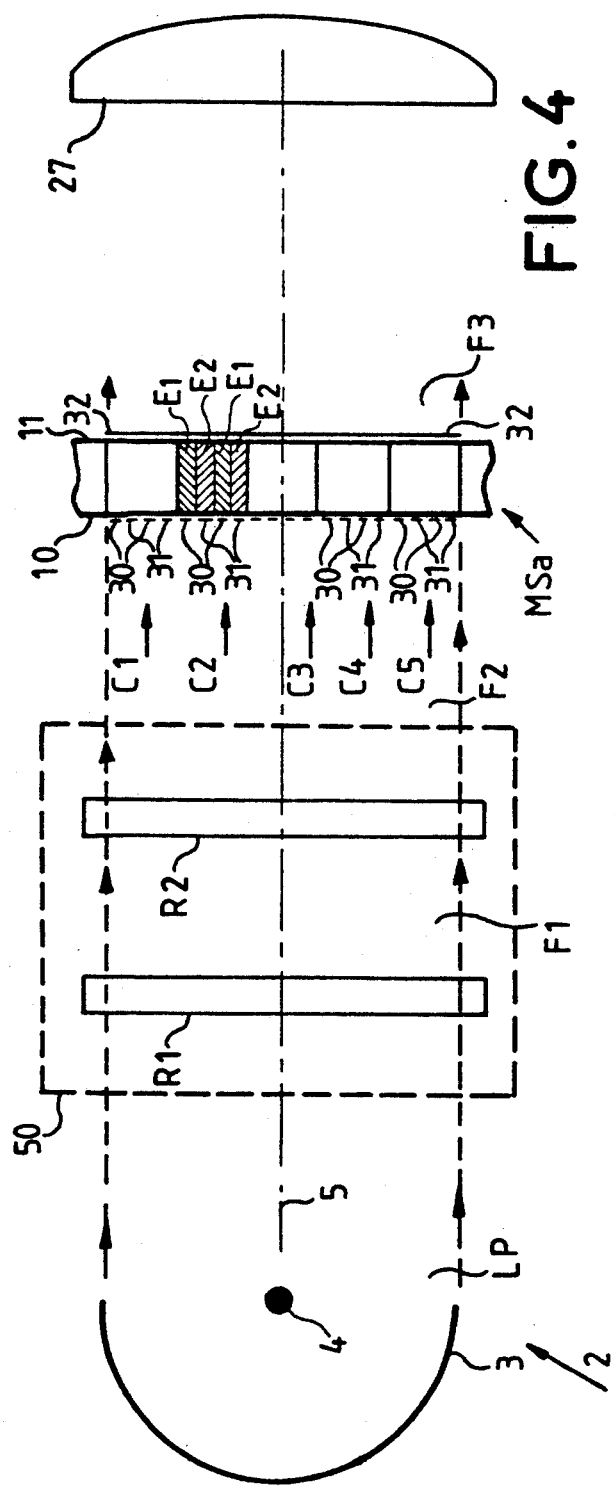
FIG. 4 illustrates a second version of the invention.

FIG. 4 illustrates another embodiment of the invention. In this embodiment, the spatial modulator screen MSa has liquid crystal modulation cells C1 to C5, each formed by a nematic cell divided into two types of elements in which the crystals are oriented along the two incident orthogonal polarizations P, S. To each orientation, i.e. each direction of polarization, there corresponds a group of electrodes 30 or 31. The two groups 30, 31 of electrodes are positioned on one and the same face 10 of each cell C1 to C5 and an electrode 32 common to both groups 30, 31 is positioned on the face 11 opposite each cell C1 to C5.

Figure 5:
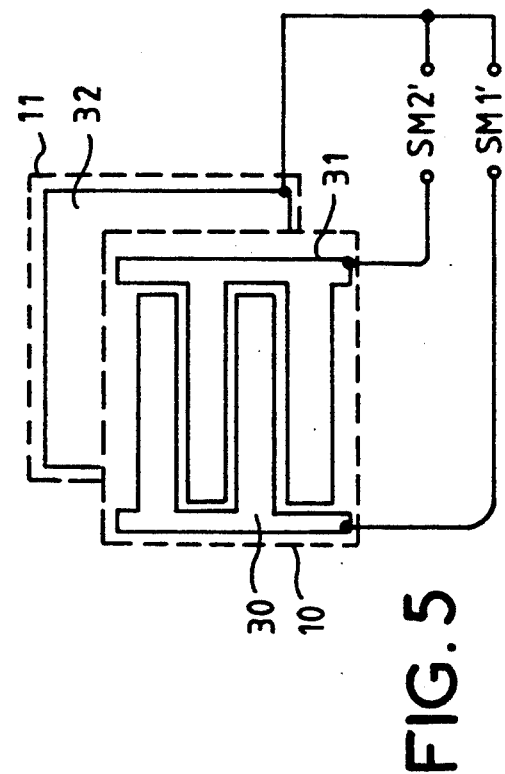
FIG. 5 shows a front view of electrodes shown in FIG. 4.

FIG. 5 shows a schematic view of the arrangement of the two groups 30, 31 of electrodes on a face 10 of a cell C1 to C5.

In fact, each set of two groups of electrodes is constituted by two arrays of interdigitated electrodes. In each array or group, the electrodes are electrically connected to one another. All these electrodes are parallel, and the electrodes of the first and second groups 30, 31 are interposed.

Each group 30, 31 receives a polarity of a modulation signal SM1', SM2' respectively, the other polarity of which is applied to the common electrode 32 located on the opposite face 11.

Referring again to FIG. 4, it is thus possible for each modulation cell C1 to C5, and more particularly in each of the types of modulation elements E1, E2, to set up, under the control of the modulation signals SM1', SM2', an electrical field the lines of which (not shown) are set up between the common electrode 32 and the electrodes of the groups 30, 31.

The modulation elements E1 of the first type are designed to act on components having the first polarization direction, and the elements E2 of the second type are designed to act on components of the second polarization direction S.

In each cell C1 to C5, the elements E1, E2 of the first and second type are alternated and succeed one another so that, in a way, they constitute layers that are parallel to the axis of propagation 5 and are, in the non-restrictive example described, perpendicular to the plane of the figure. Each electrode of the first group 30 is located so as to be facing a modulation element E1 of the first type, and each electrode of the second group 31 is located so as to be facing a modulation element E2 of the second type.

The electrical fields thus generated in the modulation elements have the effect of modifying the optical fields, i.e. the speed of propagation (in these elements E1, E2) of the components having either the first direction of polarization P, for those generated by the first group of electrodes 30 (in the elements E1), or the second direction of polarization S for those generated by the second group of electrodes 31 (in the elements E2). The difference in optical path in the modulation elements E1, E2 between their active state imposed by the groups of electrodes 30, 31 (the active state corresponds to the application of the signal SM1', SM2') and their non-active state is greater than a half wavelength.

It is then possible, by modulating the voltage of the modulation signal SM1', SM2' applied to one of the groups of electrodes 30, 31, namely to one of the types E1, E2 of modulation elements, to modify the relative phase of the components having one of the two orthogonal directions of polarization P, S without affecting the phase of the components having the other direction of polarization.

The phase difference generated by the crossing of the elements of the first or second type E1, E2 can be displayed in different ways, known per se, notably by strioscopy. This may be obtained, for example, simply by diaphragm effect related to the aperture of the projection objective 27 towards which there is propagated the beam F3 emerging from the spatial modulator screen MSa.

The difference between the two types E1, E2 of modulation elements lies in the orientations of the molecules that they contain: these orientations are orthogonal between one type and the other. The orthogonal orientation of the molecules of one type with respect to the other (whereas these two types alternate in a same cell C1 to C5) may be given, for example, by the walls or faces 10, 11 according to a practice that is standard per se, except that in the present case this orientation is not the same all over the surface of the cell C1 to C5, namely the faces 10, 11.

The orientation given to the molecules of the two types of elements is such that the first polarization P goes through the elements E1 of the first type in a fast propagation mode in every case. This is because, in the elements E1 of the first type, the molecules are always orthogonal to this first direction of polarization, both when they are oriented under the influence of the walls and when they are oriented under the effect of the electrical field, namely when the elements E1 of the first type are activated.

This same first polarization P goes through the elements E2 of the second type, also in fast propagation mode, when these elements E2 are activated, but it goes through them in slow propagation mode when they are not activated (with the electrical field not set up), namely when the molecules are oriented under the influence of the walls.

With respect to the second polarization S, it may cross the elements E1 of the first type in a slow propagation mode when these elements E1 are not activated (with the electrical field not set up) and go through these elements E1 in the fast propagation mode when they are activated, namely when the orientation of the molecules results from the establishment of the electrical field. Furthermore, this same polarization S goes through the elements E2 of the second type in the fast mode, both when these elements are activated and when they are not activated.

This version of the invention may be used in reflection or else in transmission as in FIG. 4.

What is claimed is:

1. A device of for the display of color images, comprising:
    a light source producing a beam of white light propagating along a path, known as a primary beam,,
    a spatial modulator of light disposed along the path, comprising a matrix array of n modulation cells,
    wherein each modulation cell of said spatial modulator comprises means for independently modulating transmission intensity of two orthogonal polarization directions of that part of said beam passing through said each modulation cell.

2. A display device according to claim 1, further including a chromatic polarizer device interposed in the path of the primary beam between the light source and the spatial modulator, the chromatic polarizer device delivering a secondary beam in which, firstly, the wavelengths relating to a first primary color, green, exist solely with the second direction of polarization and in which, secondly, the wavelengths relating to a second primary color, red, and a third primary color, blue, exist solely with the first direction of polarization, or vice versa.

3. A display device according to claim 2, wherein the chromatic polarizer device includes a first polarizer screen and a second polarizer screen, positioned one after the other, one of the polarizer screens eliminating the wavelengths corresponding to the first primary color and having one of the two orthogonal directions of polarization, and the other polarizer screen eliminating the wavelengths corresponding to the second and third primary colors and having the other of the two directions of polarization.

4. A display device according to claim 3, wherein the two polarizer screens include elongated molecules that are absorbent with respect to given wavelengths, oriented along parallel directions in each of the polarizer screens, these directions being perpendicular between the two polarizer screens.

5. A display device according to claim 2, further including a filtering screen comprising elementary filters, each corresponding to a given modulation cell, each filter being either of a first type letting through wavelengths relating to the second primary color, red, or of a second type letting through wavelengths relating to the third primary color, blue, the two types of filters further letting through wavelengths relating to the first primary color, green.

6. A display device according to claim 2, wherein the first primary color is the green, and wherein the second and third primary colors are the red and the blue.

7. A display device according to claim 5, wherein the first type of elementary filter is yellow, and wherein the second type of elementary filter is cyan.

8. A display device according to any of the claims 5 or 6 or 7, wherein the filtering screen is located between the chromatic polarizer device and the spatial modulator screen.

9. A display device according to any one of claims 5, 6 or 7, wherein the filtering screen is located opposite the chromatic polarizer device in relation to the spatial modulator screen.

10. A display device according to claim 1, wherein the modulator cells are liquid crystal cells.

11. A display device according to claim 10, wherein the liquid crystal is constituted by uniaxial absorbent molecules, and wherein each cell has a first set and a second set of electrodes that are independent of each other, located on opposite faces of each cell, and being active for orthogonal directions of polarization.

12. A display device according to claim 11, wherein each set is formed by a first array and a second array of electrodes, to which there are respectively applied a first polarity "+" and a second polarity "−" of a modulation signal, the electrodes of the first array being interposed with the electrodes of the second array.

13. A display device according to claim 12, wherein the electrodes of the first set extend perpendicularly to the electrodes of the second set.

14. A display device according to claim 10, wherein each cell has a first group and a second group of electrodes located on a first face of the cell and has, on a second face, an electrode common to the two groups of electrodes, the electrodes of the first group being interposed with the electrodes of the second group and wherein, when there are no signals applied to the groups of electrodes in each cell, the molecules are oriented in a first direction or in a second direction, depending on whether they are placed so as to be facing an electrode of the first group or an electrode of the second group.

15. A display device according to claim 14, wherein the first direction and the second direction of orientation of the molecules are orthogonal.

* * * * *